United States Patent
Kumar (10) Patent No.: US 10,105,984 B2
(45) Date of Patent: Oct. 23, 2018

(54) ELECTRONIC DEVICE FOR ERASING CONTENTS ON A WRITING BOARD AND A METHOD THEREOF

(71) Applicant: Wipro Limited, Bangalore (IN)

(72) Inventor: Vijay Kumar, Bangalore (IN)

(73) Assignee: Wipro Limited, Bangalore (IN)

(*) Notice: Subject to any disclaimer, the term of this patent is extended or adjusted under 35 U.S.C. 154(b) by 458 days.

(21) Appl. No.: 14/868,417

(22) Filed: Sep. 29, 2015

(65) Prior Publication Data

US 2017/0028771 A1    Feb. 2, 2017

(30) Foreign Application Priority Data

Jul. 31, 2015   (IN) .......................... 3991/CHE/2015

(51) Int. Cl.
*B43L 21/00* (2006.01)
*G06F 3/0346* (2013.01)
(Continued)

(52) U.S. Cl.
CPC .............. *B43L 21/00* (2013.01); *G06F 3/005* (2013.01); *G06F 3/016* (2013.01); *G06F 3/0304* (2013.01);
(Continued)

(58) Field of Classification Search
CPC ...... B43L 21/00; B43L 19/0006; G06F 17/24; G06F 3/005; G06F 3/016; G06F 3/0304;
(Continued)

(56) References Cited

U.S. PATENT DOCUMENTS

| 4,742,694 A | 5/1988 | Chen |
| 6,370,720 B1 | 4/2002 | Jang |

(Continued)

FOREIGN PATENT DOCUMENTS

WO    WO 00/68025    11/2000

OTHER PUBLICATIONS

European Search Report dated Dec. 7, 2016 in European Patent Office in counterpart European Patent No. Application 15202627.4, 8 pages.

Primary Examiner — Amr A Awad
Assistant Examiner — Wing H Chow
(74) Attorney, Agent, or Firm — Finnegan, Henderson, Farabow, Garrett & Dunner LLP (57) ABSTRACT

The present disclosure relates to an electronic device for erasing contents on a writing board. The electronic device comprises a motion detecting unit for detecting movement of the electronic device from resting position which then transmits an activation signal to activate a processing unit and a proximity sensor. The proximity sensor identifies proximity of the electronic device with the writing board. The processing unit receives a signal from the proximity sensor when the electronic device is proximal to the writing board. Further, the processing unit receives selection of colours through user interface on the electronic device for identifying erasable or retainable contents on the writing board. The processing unit transmits a control signal to motion control system to control moveable cleaning surface of the electronic device to perform either pulling or pushing the moveable cleaning surface backward or forward respectively based on the selection of colours.

17 Claims, 7 Drawing Sheets

(51) Int. Cl.
*G06F 3/0482* (2013.01)
*G06F 3/0484* (2013.01)
*G06T 11/00* (2006.01)
*G06F 17/24* (2006.01)
*G06F 3/03* (2006.01)
*G06F 3/0481* (2013.01)
*G06F 3/01* (2006.01)
*G06F 3/00* (2006.01)
*G06F 3/0354* (2013.01)

(52) U.S. Cl.
CPC ........ *G06F 3/0346* (2013.01); *G06F 3/03543* (2013.01); *G06F 3/03545* (2013.01); *G06F 3/0482* (2013.01); *G06F 3/04817* (2013.01); *G06F 3/04842* (2013.01); *G06F 3/04845* (2013.01); *G06F 17/24* (2013.01); *G06T 11/001* (2013.01)

(58) Field of Classification Search
CPC ............... G06F 3/0346; G06F 3/03543; G06F 3/03545; G06F 3/04817; G06F 3/0482; G06F 3/04842; G06F 3/04845; G06T 11/001

See application file for complete search history.

(56) References Cited

U.S. PATENT DOCUMENTS

| | | | |
|---|---|---|---|
| 6,948,210 B1* | 9/2005 | Shah | B43L 19/0006 15/246 |
| 8,243,028 B2 | 8/2012 | Hilderbrandt et al. | |
| 2002/0157880 A1 | 10/2002 | Atwood et al. | |
| 2012/0127088 A1* | 5/2012 | Pance | G06F 3/016 345/173 |
| 2016/0005205 A1* | 1/2016 | Liang | G06F 3/04883 345/619 |

* cited by examiner

ELECTRONIC DEVICE FOR ERASING CONTENTS ON A WRITING BOARD AND A METHOD THEREOF

PRIORITY CLAIM

This U.S. patent application claims priority under 35 U.S.C. § 119 to 3991/CHE/2015, filed Jul. 31, 2015. The aforementioned applications are incorporated herein by reference in their entirety.

TECHNICAL FIELD

The present subject matter is related, in general to erasing device, and more particularly, but not exclusively to an electronic device and a method for erasing contents on a writing board.

BACKGROUND

Generally, numerous activities in our day to day life are expressed through writings. Despite the tremendous usage of computing systems and mobiles, in many scenarios using a pen or pencil for writing on a paper or a black board is greatly convenient. In an interactive discussion, such as a meeting, a classroom session etc. a combination of board and a chalk is mostly used for capturing and expressing the views and ideas of the participants.

With advancements, the black boards now have been replaced with glass or laminate boards, and the chalks have been replaced with ink markers, which are much easier for use and reuse and maintenance, in terms of, wiping and cleaning. These new types of boards negated the use of chalks while writing and hence reduced the generation of chalk dust which was causing inconvenience. However, with the ease of use the user has started using a variety of colored markers to differentiate and/or highlight content or object that are written on the board. Given that a board needs to be reused because it has limited space, once the space on the board is full the writer has to clean the board to reuse. In many practical scenarios, a user may inadvertently wipe or erase the whole or a portion of the content written on the board which the user didn't intend to.

One of the conventional techniques discloses an eraser for electronic whiteboard which is generally used to erase a portion of the content on the electronic whiteboard or wherever the user has moved the eraser on the surface of the electronic white board. The problem with the aforementioned technique is that the eraser erases the contents only on an electronic whiteboard i.e. the writing board was limited to the electronic whiteboard and the priority of the content present on the board was not considered for erasing.

The issues mainly faced in the existing erasing techniques are there is a probability that high priority contents may get erased inadvertently and cause loss of important data.

SUMMARY

Disclosed herein is an electronic device for erasing contents on a writing board. The electronic device receives selection of one or more colours for selectively erasing or retaining the content based on the colours selected by the user.

Accordingly, the present disclosure relates to an electronic device for erasing contents on a writing board. The electronic device comprises a motion detecting unit, a proximity sensor, a user interface and a processing unit. The motion detecting unit detects movement of the electronic device from a resting position. The motion detecting unit transmits an activation signal to activate the processing unit and the proximity sensor upon detecting the movement of electronic device. Upon activation, the proximity sensor identifies proximity of the electronic device with the writing board. The processing unit receives a signal from the proximity sensor when the electronic device is proximal to the writing board. Further, the processing unit receives selection of one or more colours for identifying at least one of erasable or retainable contents on the writing board through the user interface. Further, the processing unit transmits a control signal to a motion control system wherein the motion control system controls moveable cleaning surface of the electronic device to perform at least one of pushing the moveable cleaning surface forward and pulling the moveable cleaning surface backward.

Further, the present disclosure relates to a method for erasing contents on a writing board using an electronic device. The method comprises detecting, by a motion detecting unit configured in the electronic device, movement of the electronic device from a resting position. Upon detecting the movement of the electronic device, the motion detecting unit transmits an activation signal to activate a processing unit and a proximity sensor. Further, the method comprises identifying, by a proximity sensor, proximity of the electronic device with the writing board. The method further comprises displaying on a user interface one or more colours to enable selection of one or more colours by a user. Thereafter, the processing unit receives signals from the proximity sensor when the electronic device is proximal to the writing board. The processing unit also receives selection of one or more colours for identifying at least one of erasable and retainable contents on the writing board through the user interface. The method further comprises transmitting a control signal by the processing unit to the motion control system controls moveable cleaning surface of the electronic device to perform at least one of pushing the moveable cleaning surface forward and pulling the moveable cleaning surface backward.

Further, the present disclosure relates to a non-transitory computer readable medium including instructions stored thereon that when processed by at least one processor cause an electronic device to perform receiving an activation signal from a motion detecting unit when the movement of the electronic device from the resting position is detected. The instructions further cause the processor to receive a signal from a proximity sensor when the electronic device is detected proximal to the writing board. Further, the instructions cause receiving selection of one or more colours displayed on a user interface of the electronic device for identifying at least one of erasable and retainable contents on the writing board based on the selected one or more colours. Thereafter, instructions causes the processing unit to transmit a control signal to a motion control system wherein the motion control system, controls moveable cleaning surface of the electronic device to perform at least one of pushing the moveable cleaning surface forward and pulling the moveable cleaning surface backward.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to an electronic device and a method to erase contents present on a writing board. The writing board may include, but not limited to, a laminated board, a glass board and a black board. The electronic device comprises a motion detecting unit, a processing unit, a proximity sensor, a user interface, a vibration motor, a storage unit and a motion control system. The motion detecting unit detects movement of the electronic device from resting position and upon detecting the movement activates the processing unit and the proximity sensor. The proximity sensor upon detecting the electronic device to be proximal to the writing board transmits a signal to the processing unit. Thereafter, the processing unit receives selection of one or more colours through the user interface from a user. The selected colours may be configured for either erasing the content or retaining the content on the writing board. Upon receiving the selection of the one or more colours, the processing unit transmits a control signal to a motion control system for controlling moveable cleaning surface of the electronic device. The moveable cleaning surface performs at least one of pushing the moveable cleaning surface forward and pulling the moveable cleaning surface backward based on the colour selected by the user.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
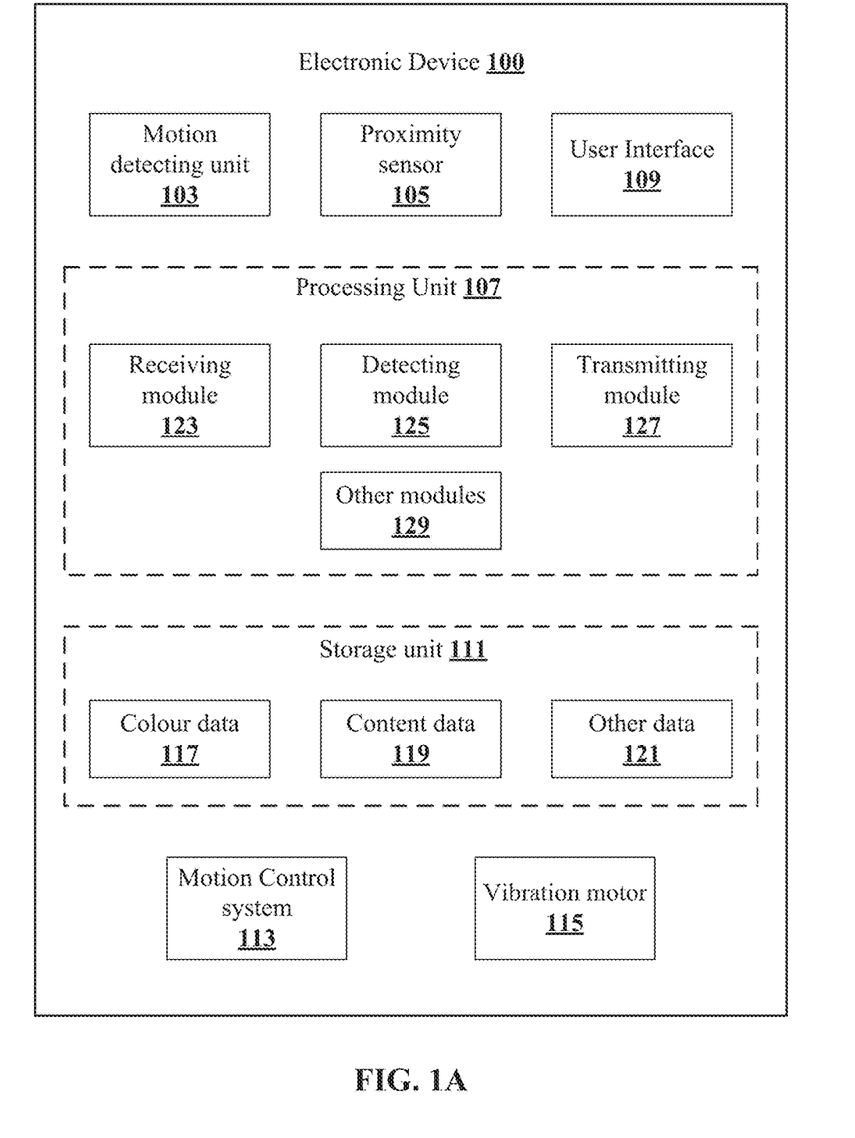
FIG. 1a shows a detailed block diagram representing an electronic device for erasing contents on a writing board in accordance with some embodiments of the present disclosure.

FIG. 1a shows a detailed block diagram representing an electronic device for erasing contents on a writing board in accordance with some embodiments of the present disclosure.

The electronic device 100 comprises a motion detecting unit 103, a proximity sensor 105, a user interface 109, a processing unit 107, a storage unit 111, a motion control system 113 and a vibration motor 115. The motion detecting unit 103 is configured to detect the movement of the electronic device 100 from a resting position. As an example, the motion detecting unit 103 may include, but not limited to, an accelerometer. In one embodiment, the resting position of the electronic device 100 may be any horizontal surface for example a table, chair etc. on which the electronic device 100 is placed. In another embodiment, the electronic device 100 may be attached to a vertical surface provided the electronic device 100 is equipped with one or more magnets. Alternatively, a suitable holder is provided in a vertical surface or a horizontal surface for holding the electronic device 100 in a resting position.

In an embodiment, during resting position of the electronic device 100, the processing unit 107 is in sleep mode. When the electronic device 100 is moved from the resting position i.e. when the electronic device 100 is picked up, the motion detecting unit 103 transmits an activation signal to the processing unit 107 and the proximity sensor 105 to activate the processing unit 107 and the proximity sensor 105. Upon activation of the processing unit 107 and the proximity sensor 105, the proximity sensor 105 detects whether the electronic device 100 is proximal to the writing board or not. If the electronic device 100 is detected proximal to the writing board, then the proximity sensor 105 transmits a signal to the processing unit 107. In one implementation, the processing unit 107 comprises one or more modules which may include, for example, a receiving module 123, a detecting module 125, a transmitting module 127 and other modules 129. The processing unit 107 further comprises of other modules 129 which may be used to perform various miscellaneous functionalities of the electronic device 100. It will be appreciated that such aforementioned modules may be represented as a single module or a combination of different modules.

The receiving module 123 of the processing unit 107 receives the signal from the proximity sensor 105. The receiving module 123 is further configured to receive selection of one or more colours from a user through the user interface 109. In an embodiment, the user interface 109 is configured to display one or more colours. In one embodiment, the one or more colours may be preconfigured in the electronic device 100. As an example, the user may preconfigure the colours based on the colour pens the user may be using or present in the discussion room before initiating the erasing operation. The user may dynamically configure the colours for selection based on the colour pens available with the user. In another embodiment, the processing unit 107 activates one or more cameras 112 configured in the electronic device 100 to capture contents on the writing board in real-time. The processing unit 107 detects one or more colours present in the captured content and these colours are displayed on the user interface 109 in real time for user selection. The one or more colours are stored in the storage unit 111.

In an embodiment, the storage unit 111 includes colour data 117, content data 119 and other data 121. In one embodiment, the data may be stored in the form of various data structures. The colour data 117 comprises information of the colours being detected by the processing unit 107. The one or more camera configured in the electronic device 100 captures the content on the writing board. The processing unit 107 detects one or more colours using the detecting module 125 from the captured content and is stored in the storage unit 111. In an embodiment, the content data 119 comprises information of the content on the writing board. The camera captures the content on the writing board and the content is stored in the storage unit 111. Additionally, the aforementioned data can be organized using data models, such as relational or hierarchical data models. The other data 121 may store data, including temporary data and temporary files, generated by modules for performing the various functions of the processing unit 107. In an embodiment, the data stored in the storage unit 111 are processed by the modules of the processing unit 107. The modules may be stored within the storage unit 111 as shown in FIG. 1a. In one example, the modules, communicatively coupled to the processing unit 107, may also be present inside the storage unit 111.

In an embodiment, the user may use the selected one or more colours to either erase or retain the contents on the writing board. As an example, the user may select the one or more colours through the user interface 109 and the contents of the selected colours may be retained on the writing board or the contents of the selected colours may be erased on the writing board. Decision of retaining or erasing the contents based on the colours is taken before erasing operation or may be preconfigured in the electronic device 100. After identifying the erasable and retainable content on the writing board, the processing unit 107 transmits a control signal to the motion control system 113 through the transmitting module 127. The motion control system 113 is configured to control movement of moveable cleaning surface 110 of the electronic device 100. As an example, when the electronic device 100 is close to the writing board then the motion control system 113 pushes the moveable cleaning surface 110 forward to erase the content if the colour selected by the user is for erasing as shown in FIG. 1d. As another example, when the electronic device 100 is close to the writing board to erase the content which is supposed to be retained, then the moveable cleaning surface 110 is pulled backward to restrict the electronic device 100 from erasing the retainable content as shown in FIG. 1e. In an embodiment, when the electronic device 100 is kept in resting position, then the processing unit 107 is put under sleep mode to save the battery in the electronic device 100. In an embodiment, the battery may include a rechargeable or non-rechargeable type. Alternatively, the electronic device 100 may be directly connected to an external power source.

In an embodiment, the vibration motor 115 is configured to provide a feedback in the form of vibration to the user when the electronic device 100 is detected proximal to the writing board for erasing the content on the writing board which is not selected by the user.

Figure 1B:
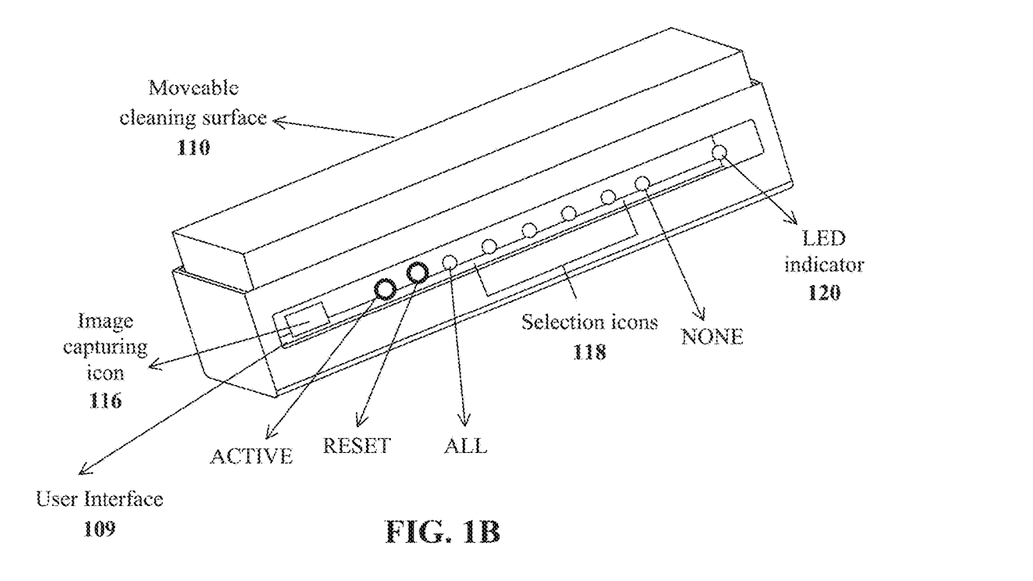
FIGS. 1b-1e show exemplary representations of an electronic device for erasing contents on a writing board in accordance with some embodiments of the present disclosure.
Figure 1C:
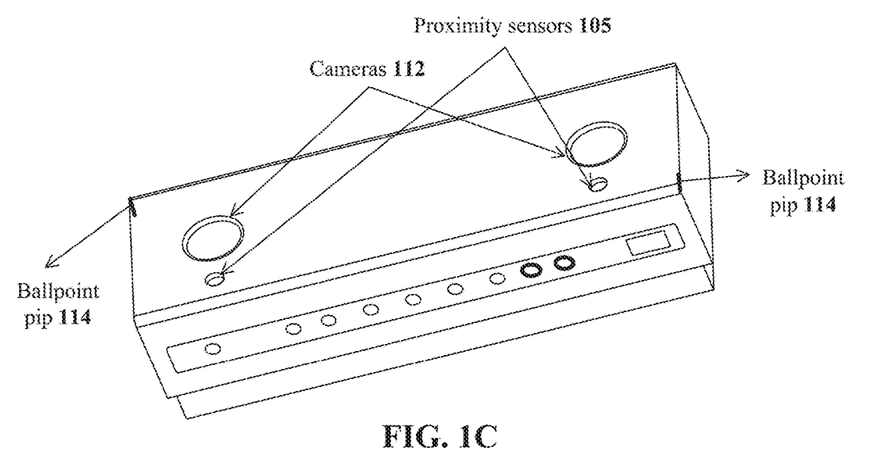
Figure 1D:
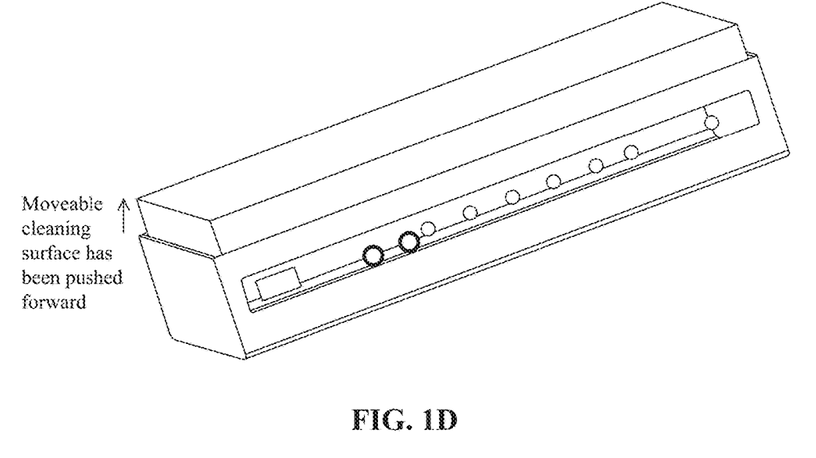
Figure 1E:
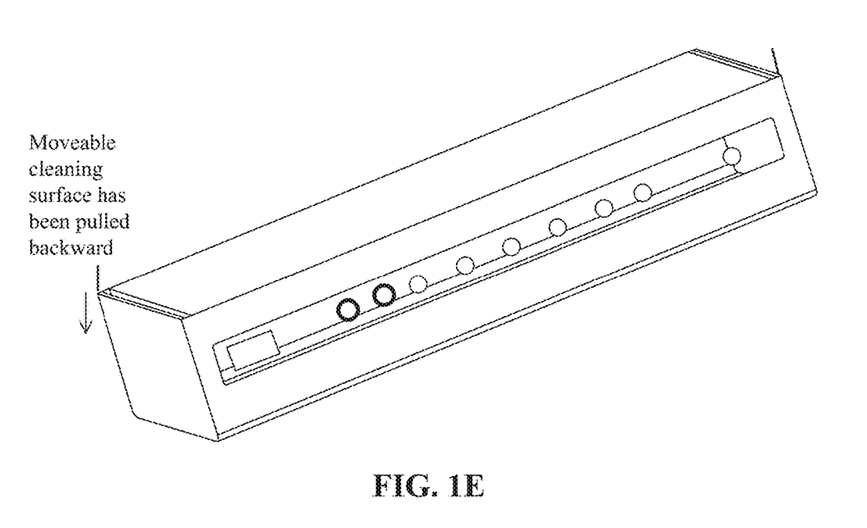

FIG. 1b shows an exemplary representation of an electronic device 100 to erase the contents on a writing board in accordance with some embodiments of the present disclosure. As shown in FIG. 1b, the electronic device 100 comprises two or more cameras 112 configured with record/capture feature and proximity sensors as shown in FIG. 1c. In an embodiment, position of the cameras 112 in the electronic device 100 is reconfigurable as per the requirement. The cameras 112 capture the contents on the writing board and store the image in the storage unit 111. Thereafter, the processing unit 107 detects the colours present in the content of the writing board using known techniques and provides it for display on the user interface 109. The user interface 109 is configured to display the colours for enabling selection by the user. The selection icons 118 include but not limited to a touch screen and buttons. As an example, the user interface 109 comprises three selection icons 118 for selecting four colours namely "RED" "GREEN", "BLACK" and "BLUE". The colours may be either preconfigured or may be based on the contents captured in real-time by the cameras 112. The user interface 109 also includes one or more buttons namely "ALL" "NONE", "ACTIVE" and "RESET". When the user activates the "ALL" button, all the contents on the writing board are selected for erasing. When the user activates the "NONE" button, none of the contents present on the writing board are erased. When the user selects the "ACTIVE" button it activates the user selected colours for either erasing or retaining. When the "RESET" button is activated, it discards the previous selection of the colours and allows the user to make a new selection of the colours. The user interface 109 further comprises of a LED indicator 120 to display the status of the selection of colours i.e. whether the colours has been selected or not, indicate movement of the eraser i.e. whether the eraser is in movement or not and to indicate error conditions and battery low conditions. The user interface 109 is also configured with image capturing icon 116. When the user selects the image capturing icon 116, the cameras 112 are activated for capturing the contents on the writing board. The user interface 109 also includes "timer" icon to set the time for the selection of colours. As an example, the user may select the colour "RED" for erasing the contents on the writing board and the user may also set 30 minutes through the "timer" icon. In this scenario, the selected colour "RED" is applicable for the selected time period.

In an embodiment, if there is more than one camera in the electronic device 100, the images captured by the cameras 112 are stitched together to provide complete image under one view.

Further FIG. 1b shows proximity sensors 105 for detecting whether the electronic device 100 is proximal to the writing board or not. As shown in FIG. 1b there are two small elements called ballpoint pips 114 which are configured at diagonally opposite corners of the moveable cleaning surface 110. When the moveable cleaning surface 110 is drawn or pulled back to avoid the erasure of retainable content, the whole body of the electronic device 100 can collapse on to the writing board, due to the pressure exerted by the user and this might erase the portion which was not intended to. The ballpoint pips 114 at the diagonally opposite corners of the electronic device 100 provide the necessary support for the electronic device 100 in such a scenario.

In an embodiment, the electronic device 100 may be configured with USB port or memory card reader slot to transmit the content data 119 to one or more other electronic devices. Alternatively, the electronic device 100 may be provide wireless communication interface, for example, Bluetooth and Wi-Fi.

In an embodiment, the electronic device 100 may detect two colours in the field of view of the electronic device 100. In this scenario, the electronic device provides a vibration feedback to the user to decide on erasing any of the two colours or if the detected colours are found to be very close to each other, and if the electronic device 100 cannot handle the granularity, then the movable cleaning surface is pulled back to avoid accidental erasure of the retainable content. In such a case, the user shall have to select "ALL" option to be able to erase the content.

Figure 2:
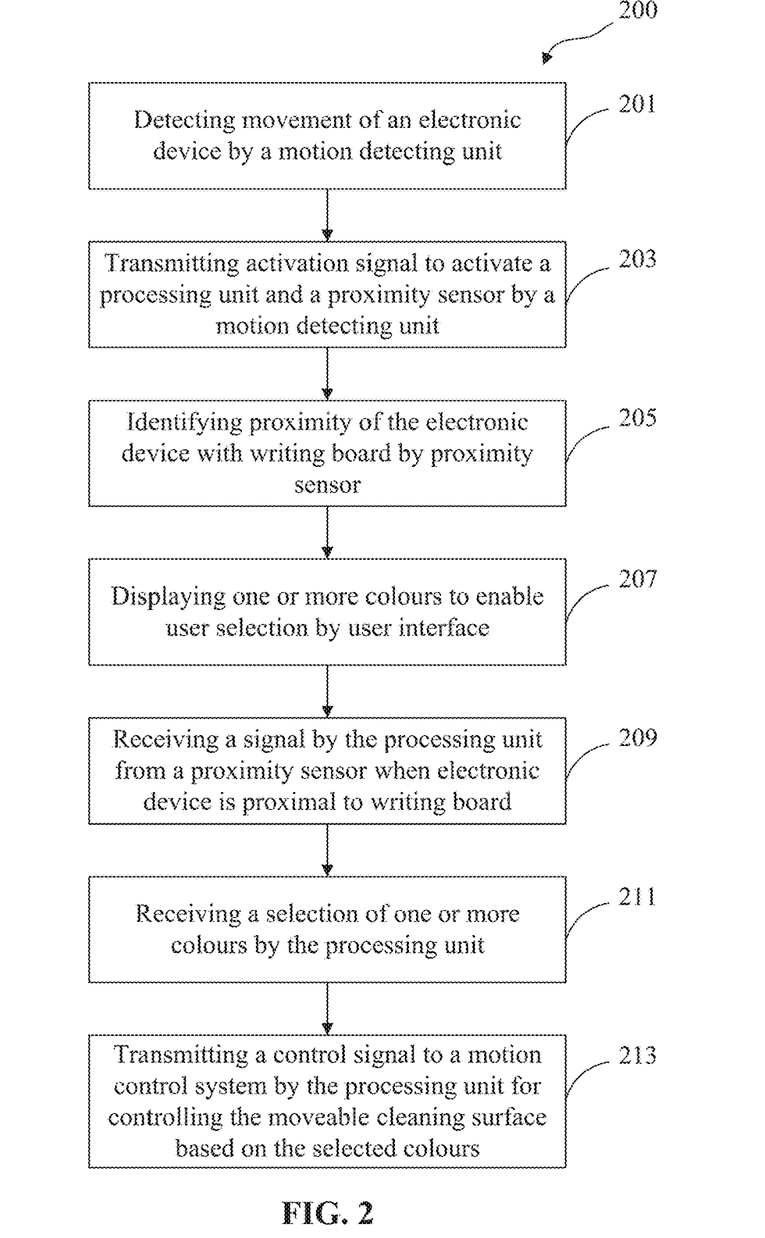
FIG. 2 illustrates a flowchart showing method for erasing contents on a writing board using an electronic device in accordance with some embodiments of the present disclosure.

FIG. 2 illustrates a flowchart showing method for erasing the contents on a writing board using an electronic device in accordance with some embodiments of the present disclosure. As illustrated in FIG. 2, the method 200 comprises one or more blocks for representing the electronic device 100 for erasing the contents on a writing board. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 201, movement of the electronic device 100 is detected. In an embodiment, the motion detecting unit 103 detects movement of the electronic device 100 from its resting position. The resting position can be either a horizontal surface or attached to a vertical surface if the electronic device 100 is equipped with one or more magnets.

At block 203, processing unit 107 and proximity sensor 105 are activated. In an embodiment, the motion detecting unit 103 transmits an activation signal to the processing unit 107 and proximity sensor 105 upon detecting the movement of the electronic device 100. Upon receipt of the activation signal, the processing unit 107 and proximity sensor 105 are activated.

At block 205, the proximity of the electronic device 100 with respect to the writing board is identified. In an embodiment, when the proximity sensor 105 is activated, it identifies whether the electronic device 100 is proximal to the writing board or not. If the electronic device 100 is proximal to the writing board then a signal is transmitted to the processing unit 107.

At block 207, one or more colours are displayed on the user interface 109. The colours displayed may either be preconfigured colours or the colours of the content captured in real-time by the cameras 112.

At block 209, the processing unit 107 receives signal from the proximity sensor 105. In an embodiment, the receiving module 123 of the processing unit 107 receives a signal from the proximity sensor 105 when the electronic device 100 is detected proximal or close to the writing board.

At block 211, the processing unit 107 receives selection of one or more colours from a user. In an embodiment, the receiving module 123 of the processing unit 107 receives selection of the one or more colours from the user. In an embodiment, the user selects the colours displayed on the user interface 109. The selected colours may be used for either erasing or retaining the contents. The user may configure the selected colours for either erasing or retaining the contents on the writing board.

At block 213, the processing unit 107 transmits a control signal to motion control system 113. In an embodiment, the transmitting module 127 of the processing unit 107 upon receiving the selection of one or more colours, transmits a control signal to the motion control system 113 Upon receiving the control signal from the processing unit 107, the motion control system 113 performs at least one of pushing the moveable cleaning surface 110 forward to erase the user selected content on the writing board and pulling the moveable cleaning surface 110 to retain the user selected content on the writing board.

Figure 3:
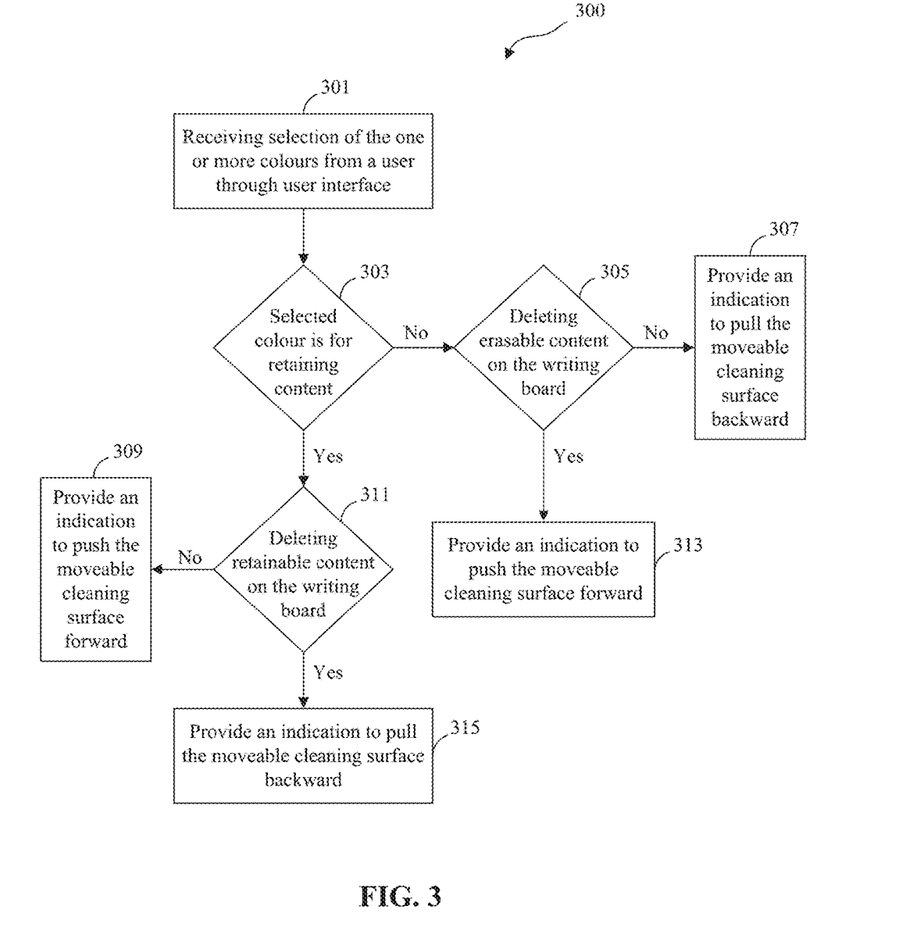
FIG. 3 shows an exemplary method illustrating a process of erasing contents based on selection of colours on the writing board implementing embodiments consistent with the present disclosure.

FIG. 3 shows an exemplary method illustrating a process of erasing contents based on selection of colours on the writing board implementing embodiments consistent with the present disclosure.

At block 301, the processing unit 107 receives selection of one or more colours through the user interface 109. As an example, the colour selected by the user may be "Red" from the one or more colours displayed on the user interface 109. The processing unit 107 receives the selection of the user. As an example, the user makes the selection of colour in order to erase or retain the contents on the writing board.

At block 303, the condition is checked to see if the selected colour is for retaining the content on the writing board. If the selected colour is for retaining the content on the writing board, then the method proceeds to block 311 via "Yes". If the selected colour is for erasing the content then the method proceeds to block 305 via "No". At block 311, the condition is checked to see if the retainable content is being deleted from the writing board. If the retainable content is being deleted from the writing board, then the method proceeds to block 315 via "Yes". As an example, the colour "RED" is selected for retaining the content. The electronic device 100 may be detected proximal to the writing board for erasing the content in the colour "RED". In this scenario, the processing unit 107 provides a signal to the motion control system 113 which in turn pulls back the moveable cleaning surface 110 and provides a vibration feedback to the user. If the retainable content is not being deleted from the writing board, then the method proceeds to block 309 via "No". As an example, the electronic device 100 may be detected proximal to the writing board for deleting the content which is in colour "BLUE". In this scenario, the processing unit 107 provides a signal to the motion control system 113 which in turn pushes the moveable cleaning surface 110 forward for deleting the content.

At block 305, the condition is checked to see if erasable content is being deleted from the writing board. If the erasable content is being deleted from the writing board, then the method proceeds to block 313 via "Yes". As an example, the selected colour may be "BLUE". The electronic device 100 is detected proximal to the writing board for erasing the content in the colour "BLUE". In this scenario, the processing unit 107 provides a control signal to the motion control system 113 which in turn controls the moveable cleaning surface 110 of the electronic device 100 such that the moveable cleaning surface 110 is pushed forward for deleting the erasable content on the writing board. If the erasable content is not being deleted from the writing board, then the method proceeds to block 307 via "No". As an example, the content in the colour "BLUE" is not being deleted on the writing board. The electronic device 100 may be detected proximal to the writing board for erasing the contents is some other colour for example "RED". In this scenario, the processing unit 107 provides a control signal to the motion control system 113 which in turn controls the moveable cleaning surface 110 of the electronic device 100 such that the moveable cleaning surface 110 is pulled back for retaining the non-erasable content on the writing board and additionally provides a vibration feedback to the user.

Advantages of the Embodiment of the Present Disclosure are Illustrated Herein.

In an embodiment, the present disclosure provides an electronic device to erase the contents of the writing board based on selection of one or more colours.

The present disclosure also provides a feature wherein the moveable cleaning surface of the electronic device is retracted thereby restricting the electronic device from erasing the content on the writing board which is not intended by the user.

The present disclosure also provides a vibration feedback to the user when the electronic device is proximal to the writing board for erasing the contents which is not intended by the user.

The present disclosure also discloses the aspect of configuring elements namely Ballpoint pips for avoiding mishandling or misbehaving of the electronic device such that the unintended content on the writing board is not erased.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and an electronic device for erasing contents on a writing board. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more processor-readable storage media may be utilized in implementing embodiments consistent with the present disclosure. A processor-readable storage medium refers to any type of physical memory on which information or data readable by a processor may be stored. Thus, a processor-readable storage medium may store instructions for execution by one or more processors, including instructions for causing the processor(s) to perform steps or stages consistent with the embodiments described herein. The term "processor-readable storage medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Electronic device |
| 103 | Motion detecting unit |
| 105 | Proximity sensor |
| 107 | Processing unit |
| 109 | User interface |
| 110 | Moveable cleaning surface |
| 111 | Storage unit |
| 112 | Cameras |
| 113 | Motion control system |

-continued

| Reference Number | Description |
|---|---|
| 114 | Ballpoint pips |
| 115 | Vibration motor |
| 116 | Image capturing icon |
| 117 | Colour data |
| 118 | Selection icons |
| 119 | Content data |
| 120 | LED indicator |
| 121 | Other Data |
| 123 | Receiving module |
| 125 | Detecting module |
| 127 | Transmitting module |
| 129 | Other Modules |

I claim:

1. An electronic eraser for erasing contents on a writing board, comprising:
   a motion detector configured to detect movement of the electronic eraser from a resting position;
   a proximity sensor configured to sense proximity of the electronic eraser with the writing board;
   a user interface configured to display a plurality of colors to enable selection of one or more colors of the plurality of colors by a user;
   a retractable erasing surface configured to be controlled by a motion control system; and
   a processor configured to:
   receive a signal from the proximity sensor when the electronic eraser is proximal to the writing board;
   receive, from the user, selection of the one or more colors for identifying at least one of erasable and retainable contents on the writing board through the user interface; and
   transmit a control signal to the motion control system, wherein the motion control system upon receipt of the control signal, controls the retractable erasing surface of the electronic eraser to perform at least one of pushing the retractable erasing surface forward and pulling the retractable erasing surface backward,
   wherein the motion detector is further configured to transmit an activation signal to activate the processor and the proximity sensor upon detecting movement of the electronic eraser.

2. The electronic eraser of claim 1, wherein the plurality of colors displayed on the user interface is based on pre-configured colors in the electronic eraser.

3. The electronic eraser of claim 1, wherein the plurality of colors displayed on the user interface is based on colors of the contents on the writing board captured in real-time by one or more cameras configured in the electronic eraser.

4. The electronic eraser of claim 3, further comprising a storage device configured to store the colors present in the captured contents.

5. The electronic eraser of claim 1, wherein the user interface comprises a selection icon, associated with an operation related to managing colors and contents on the writing board.

6. The electronic eraser of claim 1, wherein the motion control system provides an indication to pull the retractable erasing surface backward when the selected one or more colors is for retaining the contents on the writing board.

7. The electronic eraser of claim 1, wherein the motion control system provides an indication to push the retractable erasing surface forward when the selected one or more colors is for erasing the contents on the writing board.

8. The electronic eraser of claim 1, further comprising a vibration motor configured to provide a haptic feedback to the user upon detecting the electronic eraser proximal to the retainable contents on the writing board.

9. A method for erasing contents on a writing board using an electronic eraser, the method comprising:
   detecting, by a motion detector configured in the electronic eraser, movement of the electronic eraser from a resting position;
   transmitting, by the motion detector, an activation signal to activate a processor and a proximity sensor upon detecting the movement of the electronic eraser;
   sensing, by the proximity sensor, proximity of the electronic eraser with the writing board;
   displaying, by a user interface, a plurality of colors to enable selection of one or more colors of the plurality of colors by a user;
   receiving, by the processor, a signal from the proximity sensor when the electronic eraser is proximal to the writing board;
   receiving, by the processor, selection of the one or more colors for identifying at least one of erasable and retainable contents on the writing board through the user interface; and
   transmitting, by the processor, a control signal to a motion control system wherein the motion control system upon receipt of the control signal, controls a retractable erasing surface of the electronic eraser to perform at least one of pushing the retractable erasing surface forward and pulling the retractable erasing surface backward.

10. The method of claim 9, wherein the plurality of colors displayed on the user interface is based on preconfigured colors in the electronic eraser.

11. The method of claim 9, wherein the plurality of colors displayed on the user interface is based on colors of the contents on the writing board captured in real-time by one or more cameras configured in the electronic eraser.

12. The method of claim 9, wherein the colors present in the captured contents are stored in a storage device configured in the electronic eraser.

13. The method of claim 9, wherein the user interface comprises a selection icon associated with an operation related to managing colors and contents on the writing board.

14. The method of claim 9, wherein the indication to pull the retractable erasing surface backward is provided by the motion control system when the selected one or more colors is for retaining the contents on the writing board.

15. The method of claim 9, wherein the indication to push the retractable erasing surface forward is provided by the motion control system when the selected one or more colors is for erasing the contents on the writing board.

16. The method of claim 9, further comprising providing a haptic feedback to the user by a vibration motor configured in the electronic eraser upon detecting the electronic eraser proximal to the retainable contents on the writing board.

17. A non-transitory storage readable medium including instructions stored thereon that when processed by at least one processor cause an electronic eraser to perform operations comprising:
   receiving an activation signal from a motion detector when the movement of the electronic eraser from the resting position is detected by the motion detector;
   receiving a signal from a proximity sensor when the electronic eraser is proximal to the writing board;

receiving selection of one or more colors of a plurality of colors displayed on a user interface of the electronic eraser for identifying at least one of erasable and retainable contents on the writing board; and transmitting a control signal to a motion control system wherein the motion control system upon receipt of the control signal, controls retractable erasing surface of the electronic eraser to perform at least one of pushing the retractable erasing surface forward and pulling the retractable erasing surface backward.

* * * * *